Figure 1:
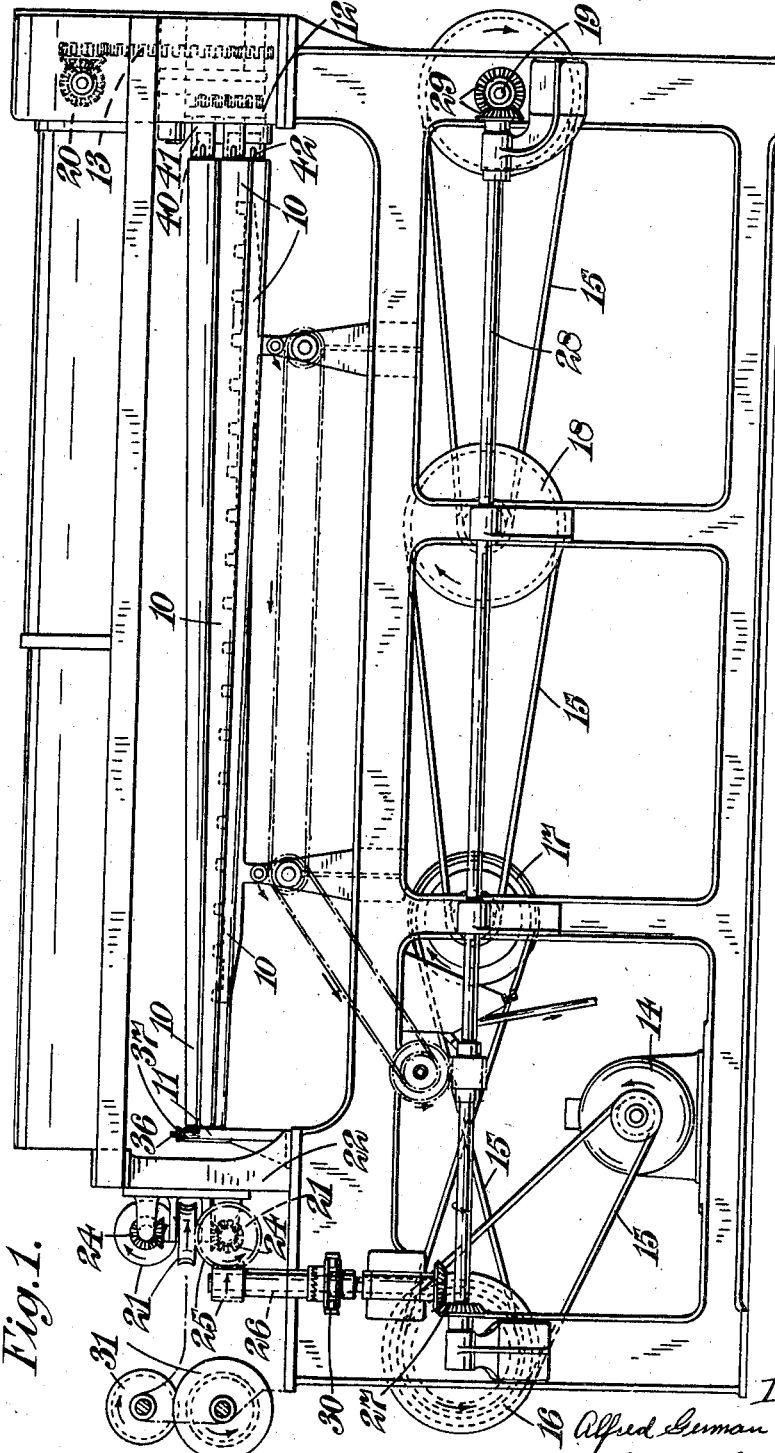

Aug. 22, 1939.  A. G. ROSE  2,170,309
APPARATUS FOR DRAWING PLASTIC MATERIAL
Filed Nov. 16, 1937  3 Sheets-Sheet 1

Aug. 22, 1939.  A. G. ROSE  2,170,309
APPARATUS FOR DRAWING PLASTIC MATERIAL
Filed Nov. 16, 1937  3 Sheets-Sheet 2
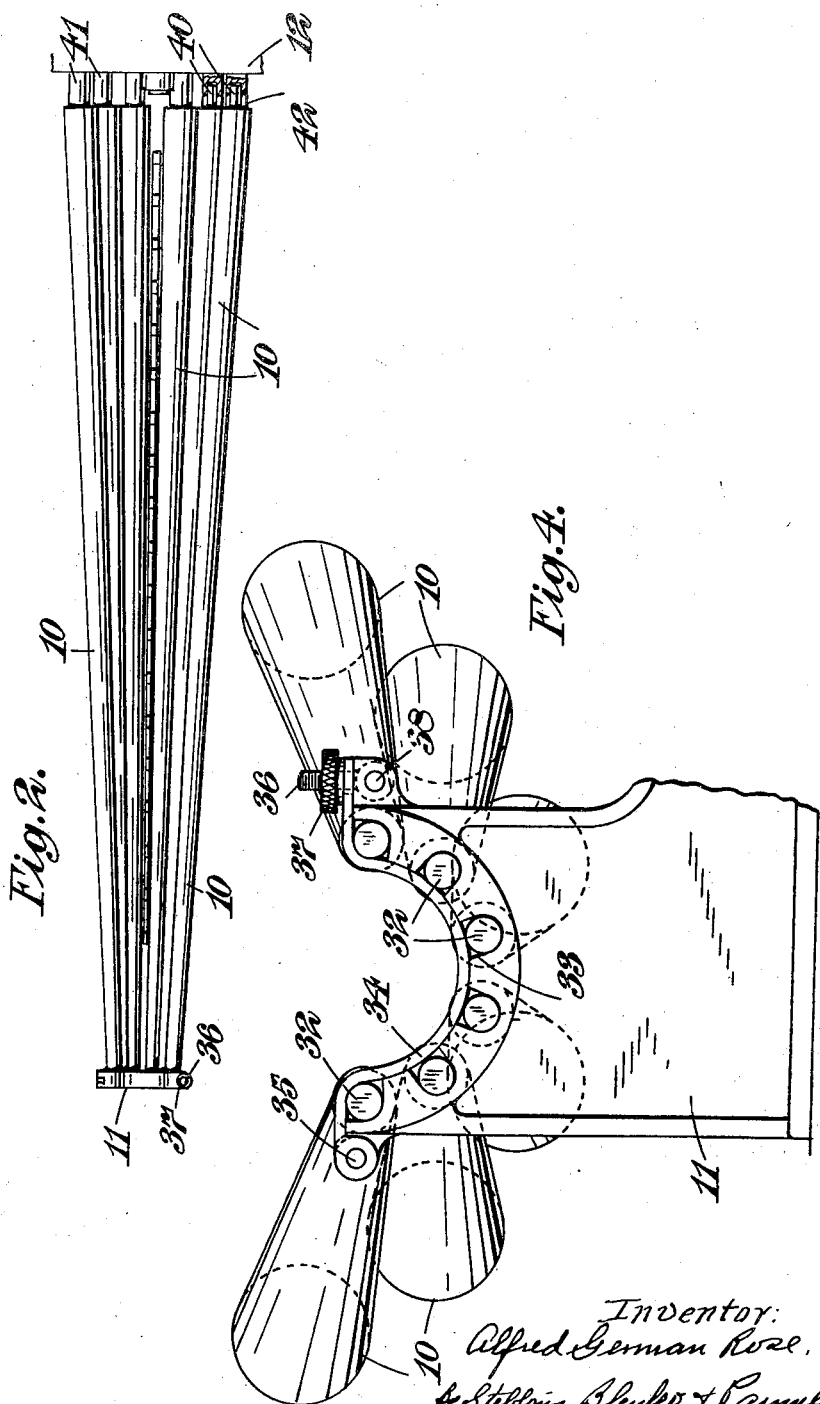

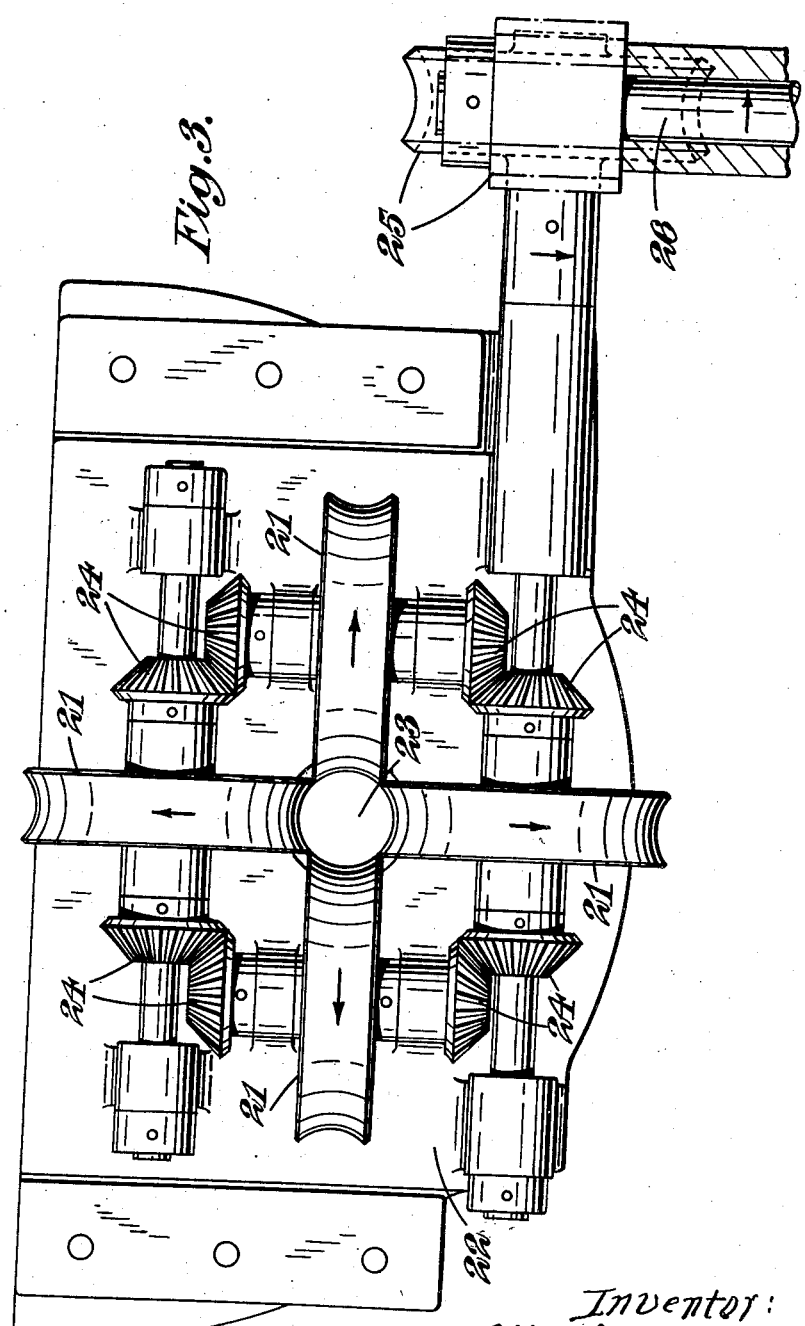

Patented Aug. 22, 1939

2,170,309

UNITED STATES PATENT OFFICE 2,170,309

APPARATUS FOR DRAWING PLASTIC MATERIAL

Alfred German Rose, Gainsborough, England, assignor to Rose Brothers (Gainsborough) Limited, Gainsborough, England, a British company Application November 16, 1937, Serial No. 174,892
In Great Britain November 18, 1936

3 Claims. (Cl. 107—10)

This invention relates to apparatus for reducing a large batch of plastic material such as toffee from an irregular dough to the form of a long cone from the narrow end of which the material may be fed as a bar of predetermined cross-section, for example to a cutting and wrapping machine.

The type of apparatus with which the invention is concerned is that comprising a plurality of long rollers (hereinafter referred to as batch rollers) located in proximity with their axes extending in the same general direction to form, for the reception of the batch, a cradle or trough, the cross-section of which is gradually reduced from end to end. In this type of apparatus the batch rollers are rotated simultaneously all in the same sense, each about its own axis, and usually first in one direction and then in the other, and by their turning action on the rough batch of plastic material, the latter is rolled into conical form. An example of apparatus of this type is disclosed in my co-pending application Serial No. 174,891, filed November 16, 1937, and issued June 14, 1938, as Patent No. 2,120,790.

This invention provides a batch rolling machine of the above type, having associated with the tapering cradle formed by the batch rollers, a bar feeding device located near the small end of the cradle and comprising a plurality of feed rollers arranged to rotate simultaneously in planes radially disposed with respect to a common axis and to form, between adjacent portions of their peripheries, a nip to engage the small end of the cone of material produced by the batch rollers and to feed said material as a bar of constant cross-section.

According to a feature of the invention the feed rollers may be so arranged that at the nip the peripheries of the rollers will engage a section of the plastic bar substantially continuously around the whole of its circumference. In the preferred form of the invention the bar feeding device comprises four feed rollers located at 90° intervals round the throughway axis of the nip.

The feed rollers may be arranged to produce at their nip a bar of any desired cross-sectional dimensions and shape. If, for example, a bar of triangular cross-section were required, this could conveniently be produced by employing three feed rollers located at 120° intervals with respect to the throughway axis of the nip. Where a bar of circular cross-section is required this may conveniently be formed by means of four rollers arranged at 90° intervals, the peripheral surfaces of the rollers being so grooved as to form, at the nip, a throughway of circular cross-section.

The invention also includes a batch rolling machine embodying a bar feeding device of the kind described above and including a continuously rotatable shaft, a driving connection between said shaft and the batch rollers, and a driving connection between said shaft and the feed rollers including a clutch operable at will to put the feed rollers into and out of action independently of the operation of the batch rollers.

According to a further feature of the invention the batch rollers are so supported that each may be readily, and independently of the others, removed from the assembly by endwise withdrawal.

An example according to the invention will now be described with reference to the accompanying drawings, in which—

Figure 1 is a side elevation of the complete machine (the lower half of the cradle casing having been omitted for the sake of clearness), Figure 2 is a fragmentary plan showing the disposition of the batch rollers, Figure 3 is an end view of the bar feeding device, and Figure 4 is an end view showing the mounting for the small ends of the batch rollers.

Like reference numerals indicate like parts throughout the drawings.

The machine illustrated is intended for the manipulation of toffee dough and comprises a long open-topped trough or cradle of conical shape formed by six batch rollers 10 arranged in an arcuate series with the axes of the rollers extending in the same general direction and tending towards a point. Each of the batch rollers 10 is itself of conical form, the corresponding big and little ends of all the rollers being located at the same ends respectively of the machine. The uppermost surfaces of the batch rollers constitute a support to receive the rough batch of toffee dough, and the arrangement is such that the lowermost portion of the supporting surface provided by the rollers is disposed approximately horizontally. The batch rollers 10 are supported at their opposite ends by bearings (indicated generically by the reference numerals 11, 12) and at their big ends are driven through a gear train 13 from the main driving mechanism of the machine. This mechanism comprises a motor 14 (Figure 1) from which the drive is taken by belting or the like 15 and intermediates 16, 17, 18 to a cross-shaft 19 and from thence by bevel gearing and a vertical shaft (neither of which is shown) through reversing mechanism 20 to the gear train 13. The arrangement is such that all the batch rollers 10 are driven in the same sense, the direction of rotation being periodically reversed by the action of the reversing mechanism 20 (which forms no part of the present invention and need not, therefore, be described in detail) which operates automatically. By the action of the batch rollers 10 the toffee dough is kept in rotation, first in one direction and then in the other, and is gradually reduced to a symmetrical conical form.

The bar feeding device which, in combination with the batch rollers, is the principal feature of this invention comprises, in the illustrated example, four feed rollers 21 which are located close to the small end of the cradle. The feed rollers are mounted on the fixed framework 22 of the machine for rotation in planes which are radially disposed at 90° intervals round a common axis 23, that is the throughway axis of the nip between the adjacent portions of the peripheries of the rollers. The peripheral surfaces of the feed rollers are located so close together at the nip that they form a conduit, the boundary walls of which are substantially continuous, and by appropriately grooving these peripheral surfaces the cross-section of the conduit is made circular, as shown in Figure 3.

The feed rollers 21 are driven by bevel gearing 24 to rotate in such manner that at the nip the roller surfaces are all moving in the same direction, i. e., away from the small end of the cradle and in the direction of the length of the toffee cone. The bevel gear train 24 is driven by worm and worm-wheel gearing 25 from a vertical shaft 26 which in turn is driven by bevel gearing 27 from a longitudinal shaft 28 continuously rotated, through bevel gears 29 from the motor-driven cross-shaft 19. A clutch 30 interposed in the vertical shaft 26 enables the drive to the feed rollers to be controlled by the machine attendant and to be put into and out of operation as required, independently of the operation of the batch rolers 10. The toffee bar after passing through the feed rollers 21 is taken through the nip between two guide rollers 31 and from thence it may be conveyed (directly or indirectly) to a cutting and wrapping machine.

In order to enable each of the batch rollers 10 to be removed, when required, from the assembly independently of the others, th rollers are supported at their big and little ends in the following way. Te little ends of the rollers (see Figure 4) are formed with journal portions 32 which are received in slots 33 in the small end bearing bracket 11. The journal portions 32 are located in position by an arcuate retaining bar 34 which at one end is pivotaly attached at 35 to the bearing bracket and at the other end is held down by a bolt 36 and nut 37. The bolt 36 is pivotally mounted at 38 on the bearing bracket and extends through an open-ended slot in the retaining bar, so that by unscrewing the nut 37, the bolt may be swung downwardly clear of the retaining bar, and the latter may then be swung over about its pivot 35 to uncover the small end journals 32. At their big ends the rollers are formed with spigot portions 40 which are received in co-operating sockets formed in head pieces 41 which are supported for rotation in the big end bearing bracket 12, and carry pinions which form part of the driving train 13. The big ends of the rollers are keyed, as at 42, to the head pieces 41 in such manner as to prevent relative rotational movement between them to permit of endwise separation of each roller from its companion head piece. When it is desired to withdraw one or more of the batch rollers, the retaining bar 32 on the small end bearing bracket is swung into the open position, the batch roller to be removed is lifted at its smaller end clear of the bearing, and the roller is then pulled towards the small end of the cradle in order to withdraw the big end from its head piece. As indicated in Figure 4, the upper surface of the curved retaining bar 34 is, in its closed position, more or less flush with the upper surfaces of the adjacent small end portions of the rollers, and in this way the retaining bar forms a guide surface over which the small end of the toffee cone may pass smoothly to the bar feeding device.

I claim—

1. A batch rolling machine of the type described comprising in combination, a plurality of rotatable batch rollers located in proximity with their axes extending in the same general direction to form a horizontally directed tapering cradle for the reception of the batch, and a bar feeding device horizontally offset from the small end of the cradle and comprising a plurality of feed rollers arranged to rotate simultaneously in planes radially disposed with respect to a common horizontal axis and to form, between adjacent portions of their peripheries, a nip with a horizontal throughway to engage the small end of the cone of material produced by the batch rollers and to feed said material horizontally forward as a bar of constant cross-section.

2. A batch rolling machine of the type described comprising in combination, a plurality of rotatable batch rollers located in proximity with their axes extending in the same general direction to form a horizontally directed tapering cradle for the reception of the batch, and a bar feeding device horizontally offset from the small end of the cradle and arranged to continuously draw material from the cone of material being shaped by the cradle.

3. Batching apparatus for preparing a plastic mass of candy or the like for delivery to a bar feeding device comprising a plurality of tapered rolls closely separated from one another and having their axes converge toward the smal end thereof, the rolers defining an open trough-shape of diminishing cross-section toward one end of the apparatus, the bottom of the trough being substantially horizontal, each roller having a spindle at its small end and resting in a bearing block, the bearing block having a strap removably secured thereon over the several spindles and conforming to the discharge end of the trough defined by the rollers, so that material will readily pass over it, the rollers having driving means at their larger ends with which they have a spline engagement, whereby each roller may be readily and independently of the others removed from the assembly by endwise withdrawal.

ALFRED GERMAN ROSE.